United States Patent [19]
Miller et al.

[11] Patent Number: 5,832,468
[45] Date of Patent: Nov. 3, 1998

[54] METHOD FOR IMPROVING PROCESS CONTROL BY REDUCING LAG TIME OF SENSORS USING ARTIFICIAL NEURAL NETWORKS

[75] Inventors: Charles Andrew Miller, Apex; Paul Michael Lemieux, Cary, both of N.C.; Paul Jeffrey Chappell, Ann Arbor, Mich.; Ronald L. Capone, Staunton, Va.; Keith Joseph Fritsky, Chapel Hill, N.C.

[73] Assignee: The United States of America as represented by the Administrator of the Environmental Protection Agency, Washington, D.C.

[21] Appl. No.: 535,405

[22] Filed: Sep. 28, 1995

[51] Int. Cl.$^6$ ............................ G06E 1/00; G06E 3/00
[52] U.S. Cl. .............................. 706/23; 706/16
[58] Field of Search .................. 382/155–159; 395/20–25, 27; 431/14; 706/15, 16, 23, 26–28

[56] References Cited

U.S. PATENT DOCUMENTS 5,197,114  3/1993  Skeirik ........................... 395/22
5,249,954  10/1993  Allen et al. ...................... 431/14
5,586,221  12/1996  Isik et al. ........................ 395/22

OTHER PUBLICATIONS

Allen, M. et al., "An imaging neural network combustion control system for utility boiler applications". Combustion and Flame, vol. 94, pp. 205–214 (1993).

Ortiz, G. et al., "A neural network approach to implement knowledge bases for electric power applications". Insituto de Investigaciones Electricas, pp. 17–1—65–13.

Fu, Chunsheng et al., "System identification and real—time pattern recognition by neural networks for an activated sludge process", Enviromental International, vol. 21, No. 1, pp. 57–69 (1995).

*Primary Examiner*—Tariq R. Hafiz
*Attorney, Agent, or Firm*—Browdy and Neimark

[57] ABSTRACT

An artificial neural network is used to predict the current state of a process based upon sensor measurements of the process variables at previous times. The output of the neural network provides the process control system with the predicted process state, thereby reducing the time lag of the sensors and providing improved control of the process.

6 Claims, 8 Drawing Sheets

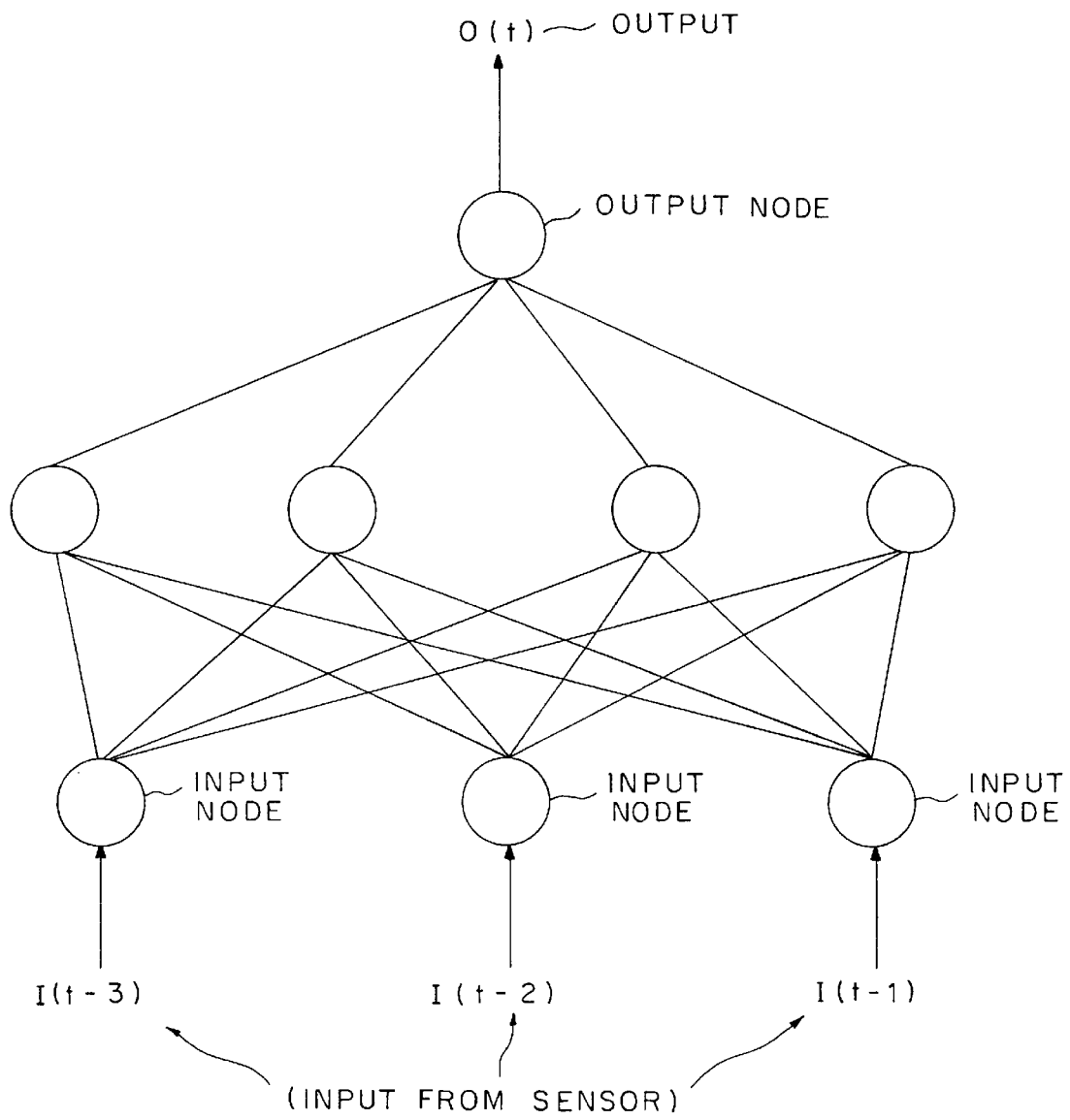

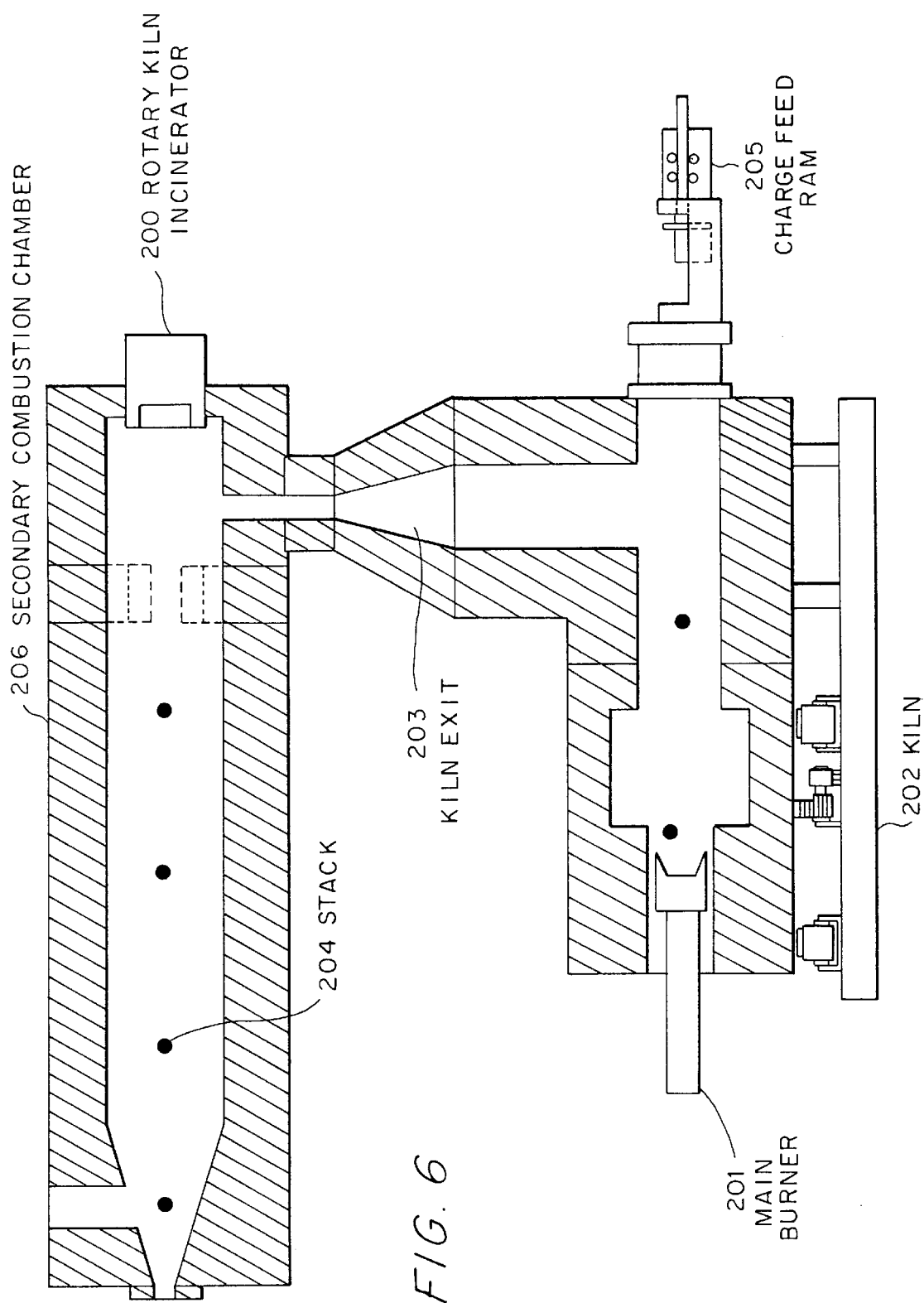

METHOD FOR IMPROVING PROCESS CONTROL BY REDUCING LAG TIME OF SENSORS USING ARTIFICIAL NEURAL NETWORKS

FIELD OF THE INVENTION

The present invention relates to a method for using artificial neural networks for reducing the effective sensor response times in a variety of processes.

BACKGROUND OF THE INVENTION

In industry, processes involved in manufacturing have been increasingly converted from manual to automatic control. Automatic controls hold the promise of increased process efficiency through greater throughput, reduced waste, and improved product quality. However, in many cases, the promise remains unfulfilled because of the complexity of the process being controlled or the need for human interaction with the process when changes must be anticipated or quality-based decisions must be made.

Measuring transient process variables is often of prime importance to the control of many industrial processes. For example, monitoring combustion flue gases forms the basis for control of combustion processes. Sensors used to monitor gases such as oxygen, carbon monoxide and hydrocarbon levels in flue gases are often used to measure the need for process changes, since fluctuations in the concentrations of these gases often indicate poor process performance. However, there are inherent time lags associated with each of these sensors, which can reduce the ability of the process control system to ace rapidly enough to counteract any transient process upset; thus the time response of the process control system is often governed by the response time of one or more process sensors.

The use of artificial intelligence (AI) has been promoted in recent years as a means for incorporating human-like responses to control systems, and AI-based control systems have been applied to a wide range of applications, from machine-based vision and character recognition to control of aircraft flight simulators. In each of these applications, the link between the process being controlled and the control system itself is one or more sensors that relay signals to the control system regarding temperature, pressure, chemical composition, light intensity, and other process variables.

Unfortunately, the time between the physical occurrence of a change in the process state and the output signal of a sensor relaying that change can often be longer than the characteristic time scale of the process changes. In such instances, the control system cannot respond quickly enough to affect the change in the process, regardless of the responsiveness of the remaining components in the system. In some cases, there is no alternative to a slow sensor response, and even if faster responding sensors are available, their cost may be prohibitively high for most industrial processes.

An alternative that can potentially reduce these sensor lag times is the use of methods that predict the process state based upon previously measured data. However, prediction of complex process states often involves highly nonlinear and interdependent chemical, physical and even molecular processes that are not fully understood. Even when the processes can be well defined by mathematical models, a solution to the set of resulting equations can often be obtained only by using large numerical models that require long computation times, thereby removing their effectiveness relative to rapid response requirements.

One method that has been useful in predicting the behavior of time-varying systems based upon previous performance is the use of artificial neural networks (ANNs). These artificial neural networks have been successful used to predict the short term behavior of complex and seemingly random systems such as the closing price of common stocks. The factors that influence the price of a particular stock, or of a stock index, are complex and diverse, ranging from quantifiable values such as the current prime interest rate and the per-share profit to data that are much more difficult to quantify, such as market confidence. Even when such influencing factors can be numerically quantified, their effects on stock prices are far from clear, as reflected in the fact that investing in stocks involves an element of risk. Thus, the attempt to create a mechanistic model of the price behavior is almost futile, and it is necessary to apply other methods if any useful predictive capability is to be obtained. One such method is with artificial neural networks.

Artificial Neural Networks

Similar to neurons in the brain, artificial neural networks are composed of a set of processing elements (or nodes) that are highly interconnected, as seen in the schematic of a neural network shown in FIG. 1a. Artificial neural networks are typically constructed in several layers of nodes. The vast majority of networks are composed of one input layer, one output layer, and one or more hidden layers, although hidden layers are not necessary for the network to operate. Hidden layers are given this term because, in applications, the only "visible" interfaces between the "real world" and the network are the input and the output layers.

Each of the nodes in the input layer receives an input signal from a sensing element. This signal may relate to the intensity of light hitting a given area, the value of a variable at some discrete time, or other physical property. The input node then processes the signal and sends an output signal to the nodes in the next layer to which it is connected. Each of the nodes in the first hidden layer receives the signals from the input nodes, processes them, and sends them to the nodes in the next layer to which it is connected. In most applications, a node is connected to each node in the next layer. This process is continued until the signals are received by the output layer. Each output layer node receives and processes the signals from the nodes in the preceding layer and then sends the fully processed signal to an output device. The output device depends on the application, but may be a controller, a video monitor, a speaker, or other device that act as an interface to allow the results of the net to be used.

The processing that is done by the nodes is based on the observation that brain neurons require some threshold input signal to be received before the neuron is "activated", i.e., before the neuron sends an output signal. All signals received by preceding nodes are summed to obtain a total input signal, which is then processed to determine whether the input is sufficiently strong to overcome the threshold value. In artificial neural networks, the processing is often in the form of a function that maps the input value to a range between 0 and 1 (a binary transfer function) or between −1 and 1 (a bipolar transfer function). The hyperbolic tangent, $$f(z)=(e^{z}-e^{-z})/(e^{z}+e^{-z}) \qquad (1)$$

is an example of a bipolar function. The graph at FIG. 1c shows the form of this function.

In general, a hidden layer node will receive input signals from each of the input nodes, sum and process them, and the n send a signal to the nodes in the following layers. In the example shown in FIG. 1, the hidden layer node 1 has three inputs: I1, I2 and I3, designating the signal from input nodes 1, 2 and 3, respectively. Each of these signals is then multiplied by the value of the connection weights, W11, W21 and W31, designating the connection weights between input node 1 and hidden node 1, input node 2 and hidden node 1, and input node 3 and hidden node 1, respectively. The output signal from hidden node 1 is then given by $$O_1 = f[\Sigma(I_j \times W_j)] \quad (2)$$

where, in this instance, the function f is defined in equation (1). Other functions can be used, depending upon the requirements of the application. Each succeeding node will process the inputs in a similar fashion until the output layer is reached. In most cases, some form of normalization is required so that the signals into the input layer and out of the output layer are between −1 and 1, or between 0 and 1.

Each internodal connection is assigned a weight by which the signal from the preceding node is multiplied. Initial weights are randomly assigned with values between −1 and 1, and are adjusted as the network is "trained", or is modified to minimize the errors between sets of known outputs and calculated outputs for given input values. This training process can be conducted by a variety of means, the best known of which is the back-propagation method, in which errors in the outputs are propagated back through the network to change the weights assigned to each connection. As the network is trained, the changes in weights decrease until, at some point, further training results in little or no change. If the training has been properly conducted, then given a set of input values that lie within the range of the inputs used to train the system, the network will produce an output that is similar to output values for similar inputs.

For each training set, the network will have a set of input values, a set of calculated output values, and a set of actual or true output values. The system can be trained by adjusting the connection weights following the sampling of each training example, or by adjusting the weights following the sampling of the entire set of training examples.

Typically, the errors are propagated back through the network using a function which incorporates the derivative of the processing (or transfer) function such as the sigmoid function in Equation (1). The connection weights are adjusted based on this derivative function, and the calculated and actual outputs are again compared. This process is repeated until an acceptable total error is achieved.

Artificial neural networks have previously been used to monitor process conditions, based upon pattern recognition. However, there has as yet been no method for controlling process conditions where there is no pattern and the process conditions are not predictable from past process conditions.

Allen et al., in *Combustion and Flame* 94:205–214, 1983, disclose a control system for utility boiler applications which used an electronic camera to image the time-resolved, chemically specific emission patterns in the flame. A neural network processed and analyzed the resultant images. Stable closed-loop control was demonstrated, based upon pattern recognition.

Ortiz et al., at the Instituto de Investigaciones Electricas in Cuernavaca, Mexico, used a prototype neural network for boiler tube diagnosis. The authors developed a learning process for a neural network which was used to obtain the connection weights that define the behavior of the neural net, and the pattern recognition process used to diagnose the mechanisms through which a boiler tube failed, given information about the tube location, its appearance after failure, and possible initiating events.

Fu et al., in *Environment International* 21(1):57–69, 1995, describe system identification and real-time pattern recognition by neural networks for an activated sludge process. This study used a neural network method to estimate chemical oxygen demand in a wastewater treatment process.

Transient Emissions from Waste Incineration

Hazardous waste, including hazardous organic compounds, is often disposed of by incineration. In the incinerator, or combustor, polymeric or carbonaceous solids are degraded by high temperature. In the presence of oxygen, any carbon, hydrogen, and sulfur present can be oxidized to carbon dioxide, water and sulfur dioxide, respectively.

In a typical combustor, batch charges of hazardous feed are fed into an incinerator such as a rotary kiln. As the charges are heated by the main kiln flame, organic compounds rapidly volatilize and enter the gas stream. In some cases, the amount of organic materials is large enough to create pockets of oxygen-depleted flue gases. Within these pockets, the organic compounds are not able to combust completely due to a local shortage of oxygen, resulting in "puffs" of organic materials, which often appear as sudden increases or spikes in pollutant levels. These puffs can contain products of incomplete combustion as well as the principal organic hazardous constituents contained in the original waste. Although the use of a secondary combustion chamber or afterburner can further reduce these organic emissions, the puff is not always destroyed completely, resulting in increased emissions of organic compounds. To reduce these puffs, an oxygen injection system can be installed on the secondary combustion chamber of the kiln to increase the oxygen available for burning out these organics. However, injecting oxygen when no oxygen deficiency exists in the flue gases does not provide any benefit and significantly increases the operational cost of the incineration system.

In a secondary combustion chamber of a hazardous waste incinerator, the transient oxygen deficiency caused by the sudden introduction of a batch of waste can pass through the combustion chamber faster than the sensors can measure the drop in oxygen and inject additional oxygen. This results in either the injection system being on all the time, which wastes oxygen, or in the system being ineffective in treating hazardous wastes where the "puff" has passed before the system can respond. In these types of incinerators, the process is unpredictable, depending partly upon the components in the initial feed, and there is no set pattern to the combustion system. For this and other reasons, a method for reducing the apparent sensor lag time would be desirable in order to improve the performance of the control system.

SUMMARY OF THE INVENTION

It is an object of the present invention to overcome the aforesaid deficiencies in the prior art.

It is an object of the present invention to improve the performance of process control systems.

It is an object of the present invention to reduce the time lag associated with process sensors.

It is another object of one embodiment of the present invention to use artificial neural networks to reduce or eliminate the time lag associated with process sensors.

It is an object of the present invention to use artificial neural networks to predict the concentrations of flue gases of a hazardous waste incinerator at a predetermined future time based upon current and previous measurements.

It is another object of the present invention to use artificial neural networks to reduce the apparent sensor lag time to improve the performance of a control system.

The present invention reduces or eliminates the time lag associated with sensors which reduces the ability of a process control system to act rapidly enough to counteract many transient process upsets, so that the time response of the process control system is not governed by the response time or one or more process sensors. The present invention reduces or eliminates this time lag by predicting the process behavior at a future time equal or substantially equal to the physical time lag of the sensor. This is particularly useful in pollution control systems because the control system can then monitor processes in apparent instantaneous time.

According to the present invention, an artificial neural network can be used to predict time-series data based upon measurements of the process variables at time t–$\tau$, where $\tau$ is the characteristic time lag of the sensor, and to utilize predictions of the variables at present time t to determine the current state of the process.

More particularly, in the case of a combustor, the present invention uses a limited set of previously measured levels of oxygen, carbon monoxide and hydrocarbons in the combustion flue gas at one or more past times as the inputs to a neural network which then predicts the value of the gas concentration levels at present time t. In this manner, the output of the neural network provides the control system with the predicted gas concentration levels at time t, thereby overcoming the time lag of the sensors.

In another embodiment of the present invention, the characteristic time lag of a sensor is very small, but the characteristic time for the system to respond is large. In this instance, the predictive capability of the artificial neural network is used to determine the state of the system at a time in the future to enable the system to begin responding prior to the change being actually measured. This is of particular importance with respect to the change in fluid level of a large vessel where the lag between changes in fluid level and the recording of that level is very short, but the ability of the associated pump and pumping system to respond to the changes is relatively long.

BRIEF DESCRIPTION OF THE DRAWINGS

FIG. 2b illustrates an artificial neural network with three inputs from one sensor and one output to a single controller.

FIG. 6 illustrates a rotary kiln incinerator simulator.

DETAILED DESCRIPTION OF THE INVENTION

Figure 1A:
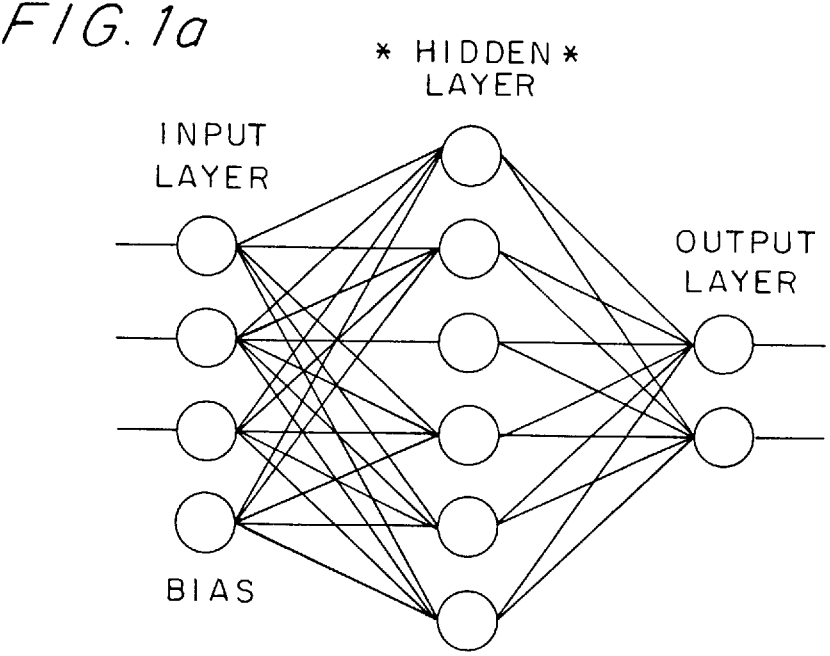
FIG. 1a is a schematic of an artificial neural network.
Figure 1B:
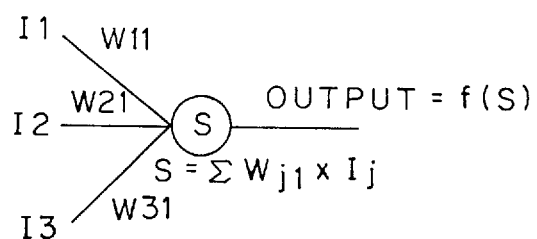
FIG. 1b is an example of the summing and processing within a single node.
Figure 1C:
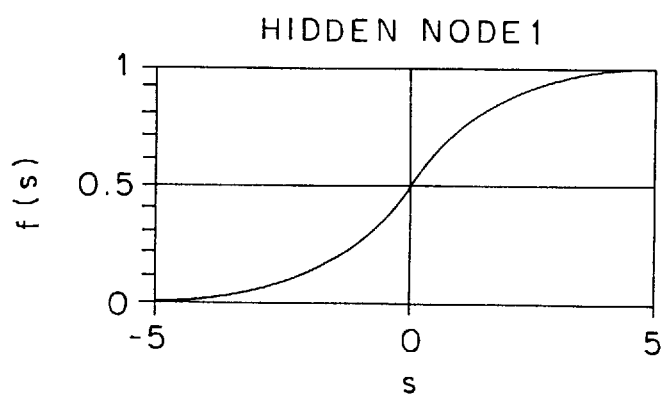
FIG. 1c shows the sigmoid function to illustrate the form of the transfer function.

The present invention provides a method for reducing the lag time of a process measurement sensing system to allow a more rapid response to changes within the system and thereby provide improved process control.

According to the present invention, an artificial neural network is used to predict changes in the input signals form the sensors at a short time $\tau$ in the future, based on the previous operating conditions in the system, thereby providing information on the state of the process more quickly than can be obtained from the sensors alone. In general, the artificial neural network takes previous input signals form sensors in a controlled process that generates periodic time-dependent signals from sensors measuring the state of the process and uses these signals to generate a predicted process state at a future time $\tau$, where $\tau$ is a characteristic lag time of the sensing system. Examples of such sensors include, but are not limited to, pressure transducers, liquid level transducers, thermocouples, gas concentration analyzers, or other process state sensors that have as output signals an electrical signal. The outputs of the sensors at a given time t reflect the actual state of the process at a time t–$\tau_i$, where $\tau_i$ indicates the time lag associated with the i$^{th}$ sensor.

The objective of the present invention is to accurately and consistently predict the state of the process at time t+$\tau$, where $\tau$ is an average time lag over all the sensors, thereby resulting in an effective response time that is significantly reduced or eliminated when compared to the sensor system without the artificial neural network.

According to the present invention, an artificial neural network receives input from sensors which sense conditions in a process, processes the signals to predict these signals at a time $\tau$ in the future, and uses the predicted signal as the input to a control system to alter the system in response to these signals. In this way, the artificial neural network is used to predict the future conditions based upon measurements of past and present conditions, and alter the conditions of the system based upon these predictions.

In one embodiment of the invention, the artificial neural network is applied to a hazardous waste incineration system. The neural network receives sensor signals from oxygen, carbon monoxide, and total hydrocarbon analyzers, processes the signals to predict these signals at a time $\tau$ in the future, and uses the predicted signal as the input to a control systems to reduce transient emissions of organic compounds. In this embodiment, a back-propagation neural network is used to predict the levels of oxygen, carbon monoxide, and total hydrocarbons. This network consists of, for example, 37 input nodes, a single 4-node hidden layer, and a three node output layer. The network was trained using a two-stage procedure designed to validate the training and to maximize the range of input values to the network. In this embodiment, the input values were conveyed to the network through the use of data files collected at an earlier time. In other embodiments, the data can be conveyed to the artificial neural network as a direct electrical signal to a data acquisition system, which then conveys the inputs to the network that is encoded into the signal processing software of the data acquisition system.

In the present invention, the apparent time lag associated with the process sensors can be reduced using the following approach:

(1) An artificial neural network is created with the appropriate number of input nodes, one or more hidden layers with the appropriate number of nodes, and the appropriate number of output nodes;

(2) The artificial neural network is initialized in an untrained condition;

(3) adequate input/output training data are collected;

(4) the network is trained to minimize the deviation between actual and calculated outputs;

(5) the appropriate sensor output signals are connected to the artificial neural network input nodes;

(6) the appropriate artificial neural network output nodes are connected to the control input signals;

(7) the artificial neural network is executed to accept sensor input and send control output.

The artificial neural network can be loaded into most modern control system software without successive reconfiguration of the controller. This may be accomplished by the use of a simple data processing module that applies the artificial neural network to the input signals without modifying the basic control parameters. For example, the LabView software offered by National Instruments allows such processing to be coded into the control software without disrupting the original control algorithm.

Figure 2A:
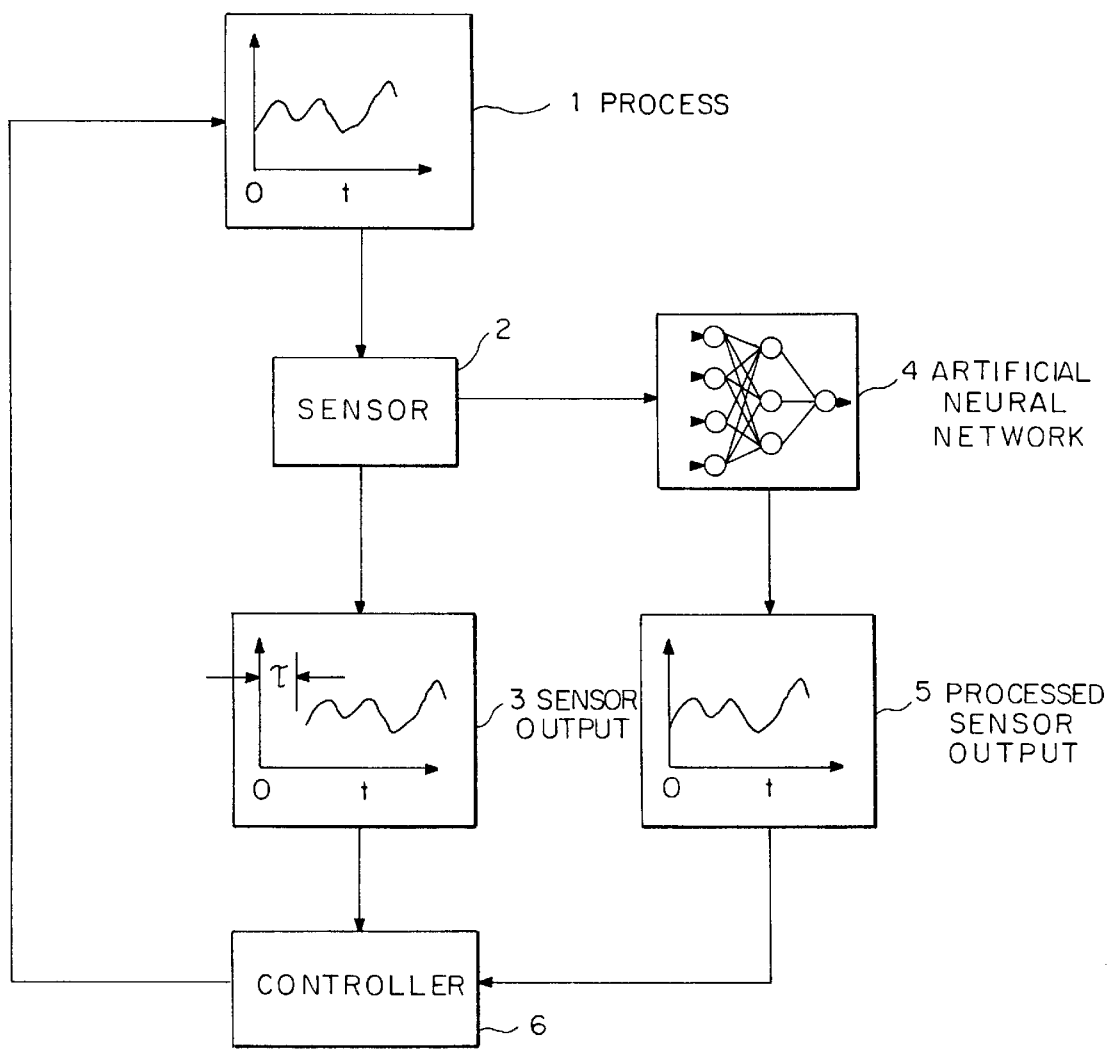
FIG. 2a is a schematic of a method for using artificial neural networks to improve process control by reducing the time lag of process sensors.

FIG. 2a provides a schematic interpretation of how artificial neural networks may be used to improve process control by reducing the lag time of process sensors. In a conventional control algorithm, sensor input from a process 1 is processed by a sensor 2 resulting in sensor output 3. FIG. 2a shows that the sensor output 3 lags behind the actual state of process 1 by a time increment $\tau$. This sensor output with lag time $\tau$ is received by controller 6, which sends a control action to process 1. In the improved control algorithm, output from sensor 2 is sent to an artificial neural network 4 which produces processed sensor output 5. FIG. 2a shows that the artificial neural network 4 significantly reduces the sensor lag time $\tau$. The processed sensor output 5 is then received by controller 6, which then sends a control action to process 1. In essence, the artificial neural network 4 provides up to date process information for the controller, thus providing improved control.

One manner in which the artificial neural network 4 reduces sensor lag time is illustrated in FIG. 2b. For purposes of illustration, assume that the sensor lag time $\tau$ is three seconds and the current, instantaneous time is designated as t. The signals from sensor 2 at time t−3, t−2 and t−1 seconds are the inputs to the input nodes of the artificial neural network 4, and are designated as I(t−3), I(t−2) and I(t−1), respectively. The output from the output node of the trained artificial neural network 4 will be a prediction of the process state at current time t. This output, which serves as input to the controller 6, is designated in FIG. 2b as O(t).

Figure 2C:
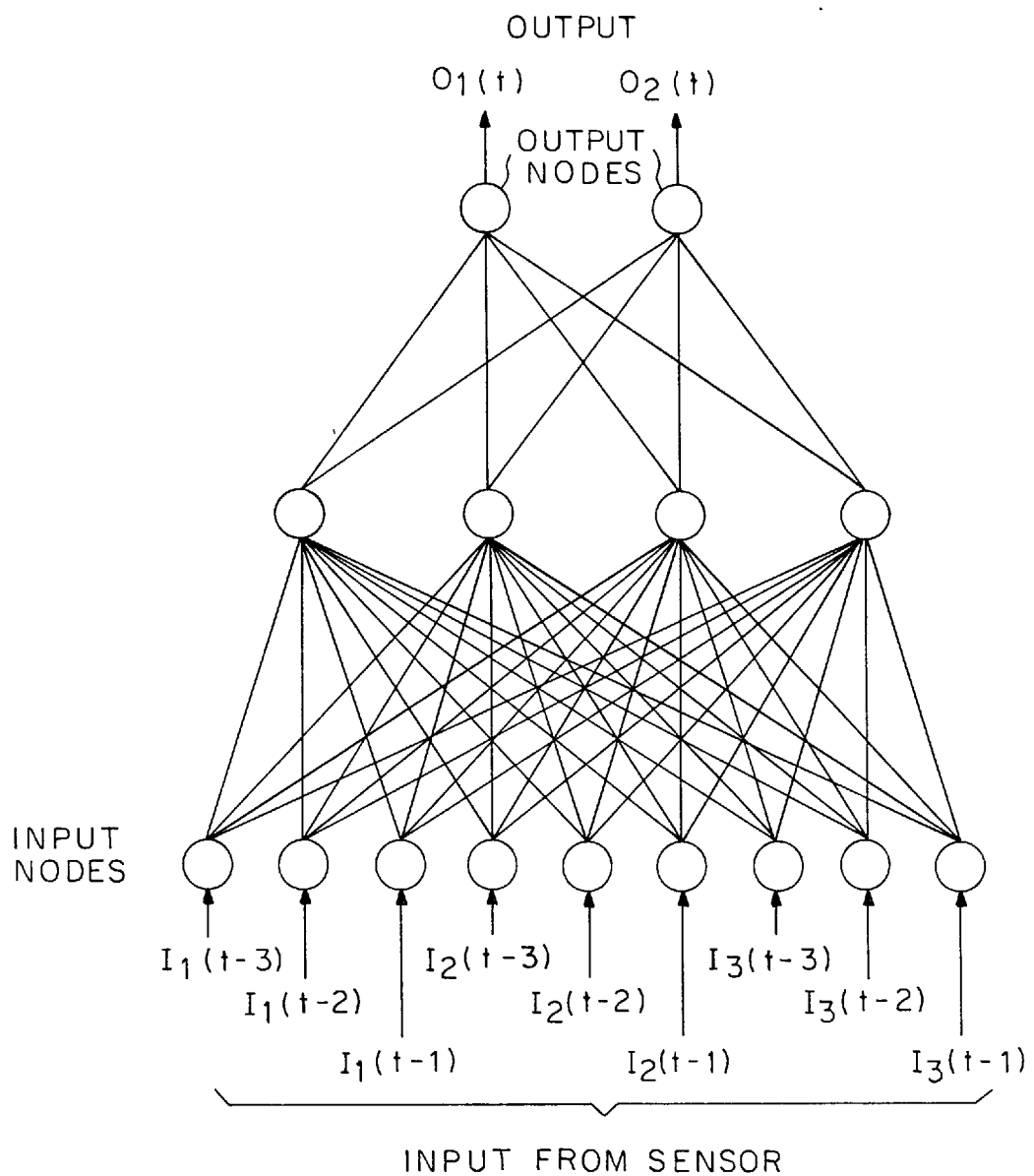
FIG. 2c illustrates an artificial neural network with nine inputs from three sensors and two outputs to two controllers.

The above approach can be modified to include additional sensors and controllers as shown in FIG. 2c. In this figure, $I_1$, $I_2$ and $I_3$ refer to inputs from different process sensors, designated 1, 2 and 3, respectively. The inputs from all three sensors are shown in FIG. 2c to correspond to the same time, t−3, t−2 and t−1. In practice, however, these previous times may be different for each sensor tied into the artificial neural network. However, the outputs from the output nodes, $O_1$ and $O_2$, correspond to the current time, t. In this example, the outputs $O_1$ (t) and $O_2$ (t) serve as inputs to two separate process controllers.

Thus, the present invention provides a method for sensing conditions within a system such as a combustor quickly enough to allow the control system to respond to rapid changes in the condition measured. According to the present invention, an artificial neural network is used to identify changes in the baseline operating characteristics of a system to provide immediate response time, independent of the response time of the individual sensors in the system.

Experiment

A rotary kiln incinerator 200 was set up as shown in FIG. 6. Reagent-grade toluene was used to simulate an organic hazardous waste, and was batch-fed into the kiln in 100 ml charges by pouring the toluene into a cardboard container filled with ground corncob sorbent material. These charges were fed into the kiln by a charge feed ram 205 and burned in the kiln section 202, which was heated by the kiln's main natural gas burner 201. Time-series data were taken from the kiln 202, at the exit of the kiln section 203 and in the stack 204, located in the secondary combustion chamber 206. Data were collected using a computerized data acquisition system, and were logged onto a disk for later uses. Concentrations of oxygen and carbon dioxide were read at five second intervals, and every 0.5 second in the case of total hydrocarbons. Carbon monoxide was measured using two analyzers, one at a scale of 0–5%, designated CO high, and one at a lower scale of 0–1000 parts per million by volume (ppmv), designated CO low. Several runs were made to collect data that were to be used as training data for the artificial neural network system. These data were then used as inputs and comparative outputs for training the artificial neural network.

The outputs of the existing gas analyzers at a given time t reflect the physical concentrations of the gases of interest at time t−$\tau_i$, where $\tau_i$ indicates the time lag associated with the $i^{th}$ analyzer. The objective of the project was to be able to accurately predict the gas concentrations at time t+$\tau_i$, thereby resulting in an effective response time of zero for each analyzer. The ability to make such predictions would allow the control system to respond to the actual concentration in the gas at time t, rather than at time t−$\tau_i$, as is now the case. This would allow the oxygen injection to occur as the puff enters the secondary combustion chamber, rather than after the puff has already passed through the system.

A back-propagation network was used to predict the behavior of oxygen, carbon monoxide and total hydrocarbons. This network consisted to 37 input nodes and one bias node, a single 4-node hidden layer, and a 3-node output layer. Although some consideration was given to using three separate networks for each of the three gas concentrations, a network successfully trained to predict all three gases would learn how the patterns for each of the gases changes with kiln conditions, and would be able to recognize the interdependent relationships among the three gases. Therefore, a better approach was to construct a network that included all three gases.

The artificial neural network was trained using a two-stage procedure designed to validate the training and to maximize the information in the data.

During the first stage, 75% of the data were selected randomly and used to train the system. The remaining 25% were used to test the network to determine whether it had learned correctly. This out- of-sample test showed that the learning had been satisfactory (the Pearson's r values of the out-of-sample test points fell between 0.98 and 1.00). During the second stage of testing, the network was retrained using all of the data. The network was trained using an extended delta-bar-delta error training paradigm for 60,000 presentations of the training data, and an epoch size of 200.

Figure 3:
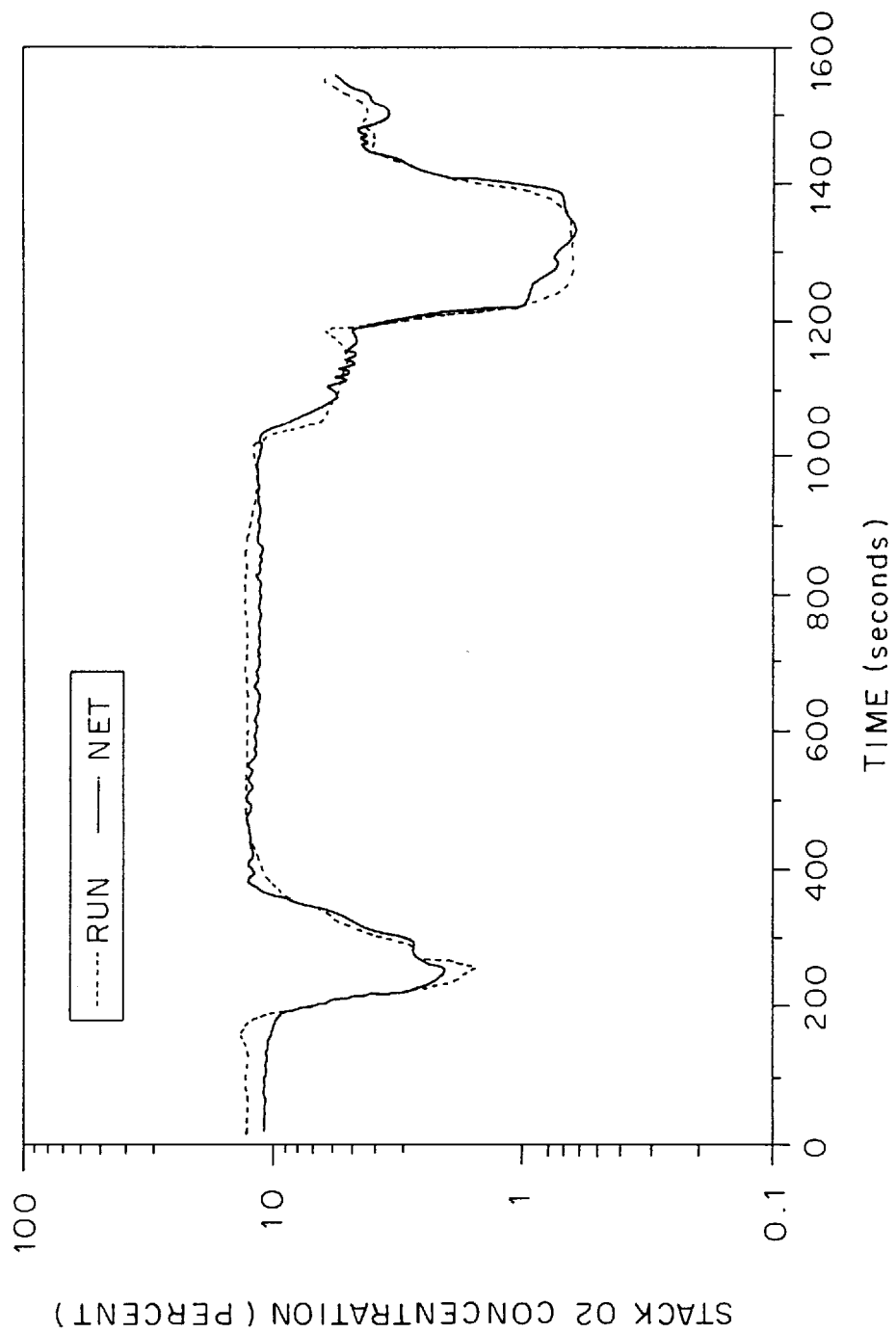
FIG. 3 shows actual an predicted oxygen concentration in percent versus time for one run.
Figure 4:
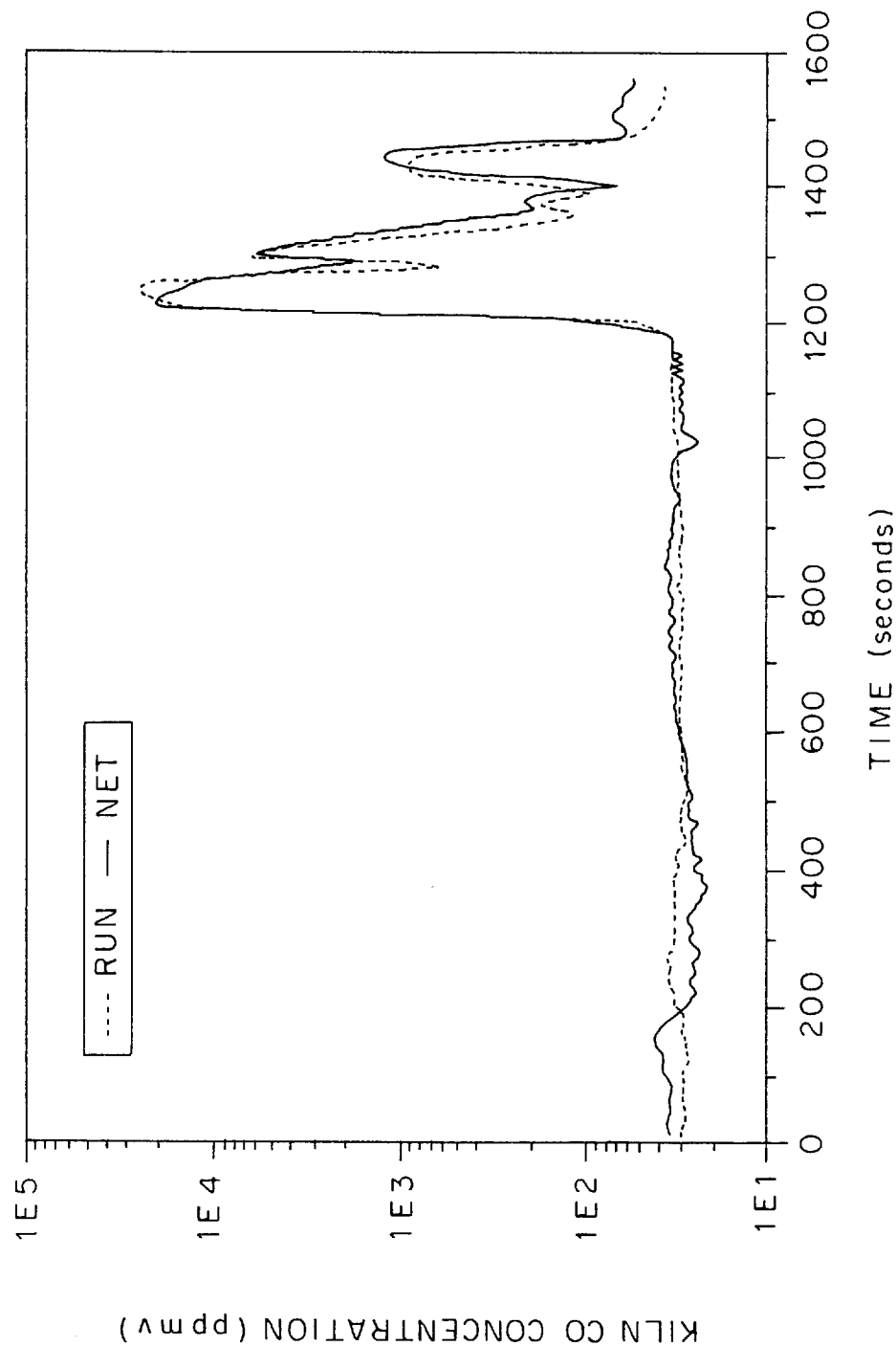
FIG. 4 shows actual and predicted carbon monoxide concentration in ppm versus time for one run.
Figure 5:
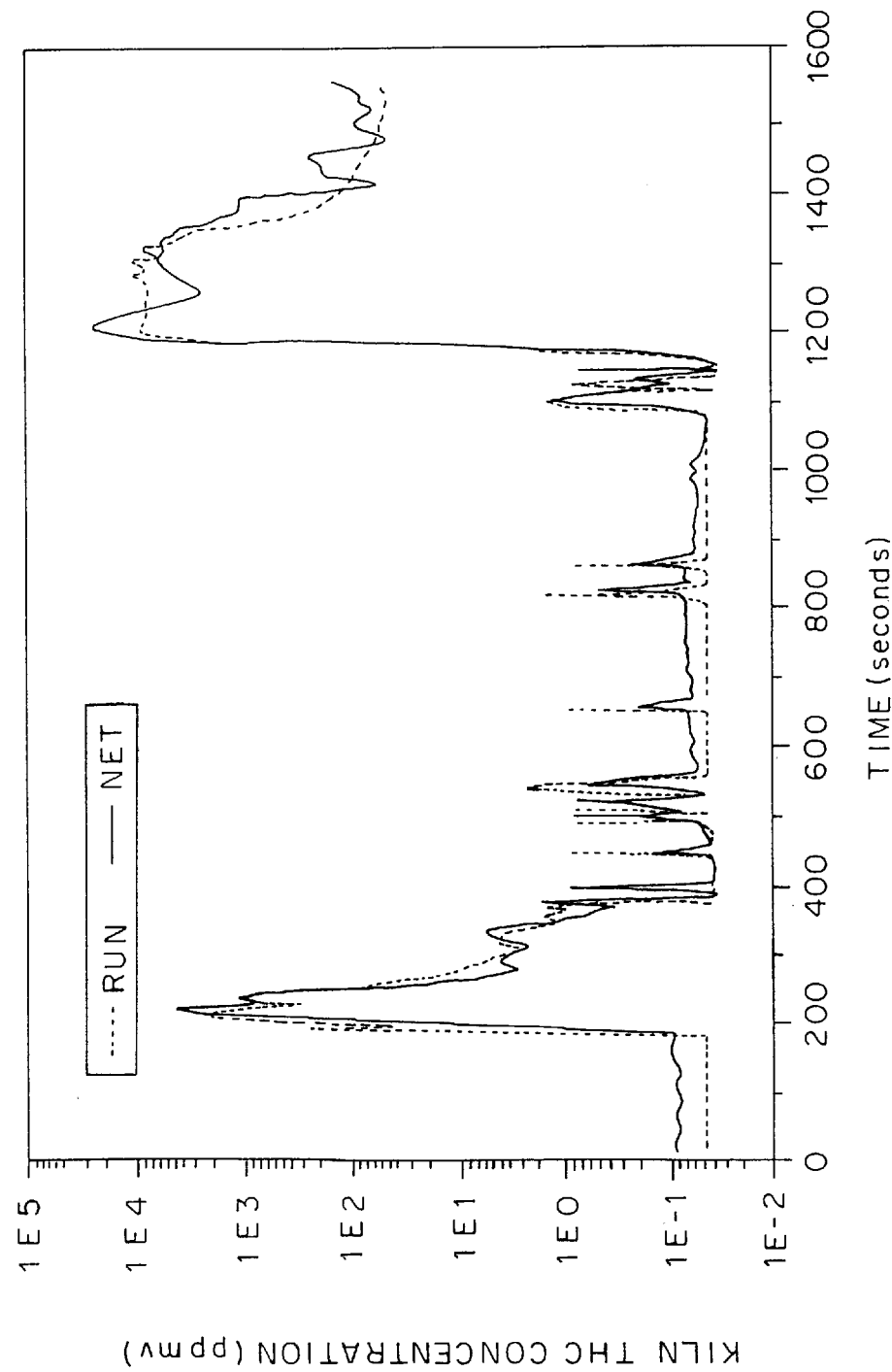
FIG. 5 shows actual and predicted total hydrocarbon concentration in ppm versus time for one run.

This two-stage procedure is valid because the first stage of training demonstrated that the network had learned the patterns and had not "memorized" the individual training data points. Thus, having demonstrated that the artificial neural network learns during stage 1, the objective of stage 2 was to expose the network to the maximum amount of information, allowing it to improve its learning. FIGS. 3, 4 and 5 show the results from stage 2 training.

Results

FIGS. 3, 4 and 5 plot the predicted and actual values of oxygen, carbon monoxide and total hydrocarbons, respectively. As can be seen, the artificial neural network was able to predict the gas concentrations very well for oxygen and carbon monoxide, even when the carbon monoxide levels increased over three orders of magnitude. Because of the relatively long analyzer times, concentrations of oxygen and carbon monoxide observed during these and similar tests have been relatively smooth. The time required for the analyzers to convert the gas concentrations into an electronic signal tended to dampen out strong fluctuations in these gases. The total hydrocarbon analyzer, however, operated faster than the others, with the result that short spikes were noticeable during test runs. These spikes are clearly seen in FIG. 5, and the values predicted by the artificial neural network closely follow these spikes, although the spike magnitude is not always predicted accurately. It should be noted that different chemicals will result in different puff shapes, requiring additional training for accurate net performance.

Some time lag remains between the prediction and the actual values, and it is particularly noticeable in the total hydrocarbon results. In some cases, the predicted total hydrocarbon value did not significantly improve over the value measured at time t which reflected the actual total hydrocarbon concentration at time $t-\tau_3$, $\tau_3$ being the lag time associated with the total hydrocarbon analyzer. However, for oxygen and carbon monoxide, the network predicted values much better, particularly in comparison to the analyzer response times. As an example, the typical lag time for the oxygen analyzer used in this experiment was approximately 30 seconds (including the sampling line lag time). The network was able to accurately predict the behavior of oxygen concentration in the kiln at times of 20 seconds in advance and greater, reducing the lag time by at least 67% and providing improved system response. By allowing the control system to monitor all three gases, and inject oxygen when any of the three readings indicates the presence of a puff, thereby improving the overall performance of the system is greatly improved.

The artificial neural network was able to identify seemingly random spikes characteristic of total hydrocarbon concentrations, which indicates that the application of artificial neural networks to this problem can reduce the apparent lag time of the analyzers, providing faster response to upset conditions.

The artificial neural network can be loaded into most modern control system algorithms without excessive reconfiguration of the system.

The foregoing description of the specific embodiments will so fully reveal the general nature of the invention that others can, by applying current knowledge, readily modify and/or adapt for various application such specific embodiments with out departing from the generic concept, and therefore such adaptations and modifications are intended to be comprehended within the meaning and range of equivalents of the disclosed embodiments. It is to be understood that the phraseology or terminology herein is for the purpose of description and not of limitation.

All references cited in this specification are hereby incorporated by reference.

What is claimed is:

1. A method for controlling a process for waste incineration in response to input signals from at least one sensor using time series measurements of at least one parameter to predict said at least one parameter at a future time so as to eliminate sensor lag time comprising:

generating periodic time-dependent signals from said at least one sensor measuring at least one parameter of said process for waste incineration;

transmitting said time-dependent signals to an artificial neural network which has been trained to predict future parameters in said process for waste incineration;

obtaining predictions of current parameters in said process for waste incineration from said artificial neural network; and transmitting said predictions of current parameters in said process for waste incineration to a controller for said process for waste incineration.

2. The method according to claim 1 wherein multiple sensors are used.

3. The method according to claim 1 wherein said artificial neural network has been trained by:

(a) collecting input/output training data;

(b) training the network to minimize deviation between actual and calculated outputs; and (c) connecting appropriate sensor output signals to input nodes of the artificial neural network.

4. A method for predicting the concentrations of components of flue gases exiting from an incinerator at a future time in response to input signals from at least one sensor using time series measurements of the concentrations of components of flue gases to predict the concentrations of flue gases at a future time so as to eliminate sensor lag time comprising:

generating periodic time-dependent measurements of concentrations of flue gases from said at least one sensor measuring the concentrations of flue gases exiting from the incinerator;

transmitting said time-dependent signals to an artificial neural network which has been trained to predict future concentrations of components of flue gases in said incinerator;

obtaining predictions of current concentrations of flue gases in said incinerator from said artificial neural network; and transmitting said predictions of current concentrations of flue gases in said incinerator to a controller for said incinerator.

5. A method according to claim 1 wherein multiple sensors are sued.

6. A method according to claim 1 wherein said artificial neural network has been trained by:

(a) collecting input/output training data;

(b) training the network to minimize deviation between actual and calculated outputs; and (c) connecting appropriate sensor output signals to input nodes of the artificial neural network.

* * * * *